(12) United States Patent
Di Loreto

(10) Patent No.: US 12,473,999 B1
(45) Date of Patent: Nov. 18, 2025

(54) SELECTABLE LENGTH CONDUITS

(71) Applicant: Richard Di Loreto, Oxford, FL (US)

(72) Inventor: Richard Di Loreto, Oxford, FL (US)

( * ) Notice: Subject to any disclaimer, the term of this patent is extended or adjusted under 35 U.S.C. 154(b) by 0 days.

(21) Appl. No.: 19/286,855

(22) Filed: Jul. 31, 2025

Related U.S. Application Data

(60) Provisional application No. 63/680,003, filed on Aug. 6, 2024.

(51) Int. Cl.
*F16L 9/22* (2006.01)

(52) U.S. Cl.
CPC ..................... *F16L 9/22* (2013.01)

(58) Field of Classification Search
CPC ........................................................ F16L 9/22
USPC ................................................. 138/155, 102
See application file for complete search history.

(56) References Cited

U.S. PATENT DOCUMENTS

| | | | | |
|---|---|---|---|---|
| 1,801,500 A | * | 4/1931 | Gottwald | F16L 59/141 138/108 |
| 4,314,775 A | * | 2/1982 | Johnson | F16L 1/036 138/155 |
| 4,647,256 A | * | 3/1987 | Hahn | F16L 9/22 138/155 |
| 4,951,714 A | * | 8/1990 | Detzel | F16L 59/123 138/155 |
| 9,733,446 B1 | * | 8/2017 | Haagenson | G02B 6/44384 |
| 2012/0211119 A1 | * | 8/2012 | Rule | F16B 3/00 138/155 |
| 2015/0251257 A1 | * | 9/2015 | Shaw | B23D 57/0015 30/380 |
| 2018/0363810 A1 | * | 12/2018 | Smith | F16L 9/22 |
| 2021/0324685 A1 | * | 10/2021 | Rudolph | E21B 7/208 |

* cited by examiner

*Primary Examiner* — David R Deal
(74) *Attorney, Agent, or Firm* — Mohr Intellectual Property Law Solutions, PC

(57) ABSTRACT

Selectable length conduits including a tubular body and a brace member. The tubular body has a tube wall with an outer surface. The tube wall defines a channel extending through the tube wall radially from the outer surface towards a longitudinal axis of the tubular body and circumferentially around the tubular body. The channel defines a channel gap between channel sidewalls of the tube wall spaced across the channel. The brace member is disposed in the channel and extends across the channel gap to abut the channel sidewalls. The brace member maintains the structural integrity of the tube wall against shear forces and is selectively removable from the channel. The channel weakens the structural integrity of the tube wall when the brace member is selectively removed from the channel to enable the tube wall to shear at the channel when shear force is selectively applied to the tube wall.

20 Claims, 6 Drawing Sheets

SELECTABLE LENGTH CONDUITS

CROSS REFERENCE TO RELATED APPLICATIONS

This application claims priority to U.S. Application, Ser. No. 63/680,003, filed on Aug. 6, 2024, which is hereby incorporated by reference for all purposes.

BACKGROUND

The present disclosure relates generally to conduits. In particular, selectable length conduits are described.

Conduits are routinely used to convey fluids and to physically isolate electrical wires in homes and businesses. Conduits are typically installed behind walls and underneath floors, which makes accessing and adjusting them challenging. For example, the space around installed conduits is often quite limited, and the tight space can interfere with attempts to use tools on the conduit.

Cutting installed conduits in tight spaces is a particular challenge. It can be impractical or impossible to use a saw on conventional conduits when they are installed behind a wall or underneath a floor because there is insufficient space to move the saw relative to the conduit. Damaging conductors inside conduits when attempting to cut conventional conduits is a problem with conventional approaches.

Use of cutting wire instead of a saw is a known technique for cutting conduit in a tight space. However, conventional cutting wire approaches require a technician to supply a cutting tool. Further, conventional cutting tool approaches require a technician to position the cutting tool at a desired cut location. Another difficulty with conventional cutting tool techniques is that the technician must maintain the position of the cutting tool at the desired cut location despite the tendency for the cutting tool to slide up or down the conduit wall rather than cleanly bite into the conduit wall.

It would be desirable to have a conduit that enabled one to easily cut the conduit to a desired length without damaging the wires inside the conduit. It would be beneficial if the conduit had multiple defined cut positions that could be selected and readily used rather than having to start a cut at undefined positions.

A conduit that had all components necessary to cut the conduit incorporated into it to use when needed would be convenient. Cutting a conduit would be facilitated if simply pulling a cord would prepare the conduit to be cut.

Thus, there exists a need for selectable length conduits that improve upon and advance the design of known approaches to cutting conduits. Examples of new and useful selectable length conduits relevant to the needs existing in the field are discussed below.

Disclosure relevant to cutting conduits is included in the following Patent References: U.S. Pat. No. 9,733,446, US2015/0251257, and WO1993/12917A1. The complete disclosures of the above patents and patent applications are incorporated herein by reference for all purposes.

SUMMARY

The present disclosure is directed to selectable length conduits including a tubular body and a brace member. The tubular body has a tube wall with an outer surface.

The tube wall defines a channel extending through the tube wall radially from the outer surface towards a longitudinal axis of the tubular body and circumferentially around the tubular body. The channel defines a channel gap between channel sidewalls of the tube wall spaced across the channel.

The brace member is disposed in the channel and extends across the channel gap to abut the channel sidewalls. The brace member is configured to maintain the structural integrity of the tube wall against shear forces by restricting the channel sidewalls from moving towards each other across the channel gap when shear force is applied to the tubular body.

The brace member is selectively removable from the channel. The channel is configured to weaken the structural integrity of the tube wall when the brace member is selectively removed from the channel to enable the tube wall to shear at the channel when shear force is selectively applied to the tube wall.

DETAILED DESCRIPTION

Figure 1:
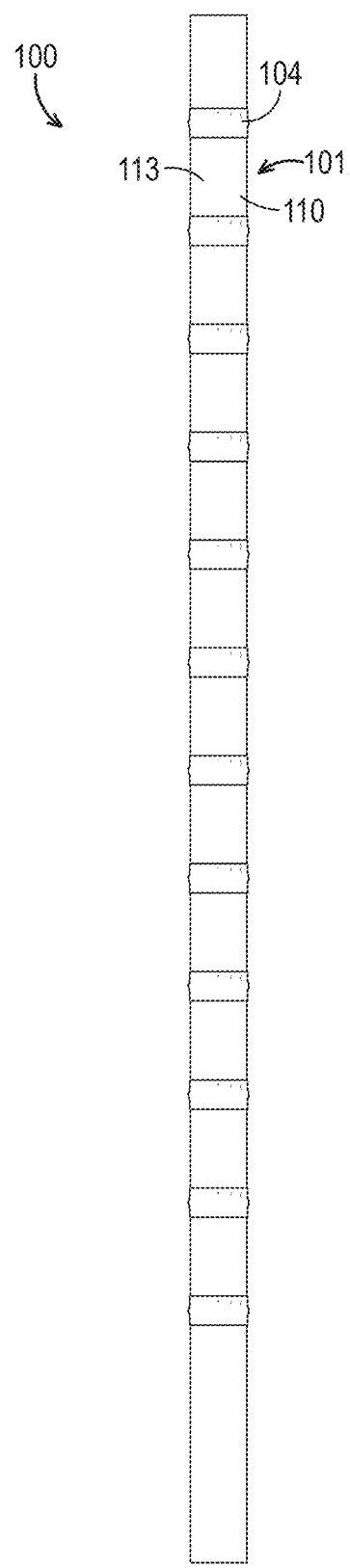
FIG. 1 is a side view of a first example of a selectable length conduit.

The disclosed selectable length conduits will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various selectable length conduits are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Selectable Length Conduits

With reference to the figures, novel selectable length conduits will now be described. The novel selectable length conduits discussed herein function to contain fluids or electrical wiring. The novel selectable length conduits are configured to enable readily cutting the conduits to predefined lengths when installed in tight spaces and without damaging wires inside the conduit.

The reader will appreciate from the figures and description below that the presently disclosed selectable length conduits address many of the shortcomings of conventional approaches to cutting installed conduits to selected lengths. For example, the novel selectable length conduits do not require a technician to supply a cutting tool. Instead, means to reduce the length of the conduit is incorporated into the novel selectable length conduits.

Further, the novel selectable length conduits do not require a technician to position and attempt to maintain a cutting tool at a desired cut location when cutting conduit like conventional cutting wire approaches require. Advantageously, the novel selectable length conduits have integral break points at defined cut locations along the length of the conduit. As a result of the novel design of the selectable length conduits described herein, one does not need to use cutting wire to cut into the conduit wall, but instead can conveniently break the conduit apart to a desired length.

Desirably, the novel selectable length conduits enable easily adjusting the length of the conduit when installed in tight places without damaging internal wires. The novel selectable length conduits helpfully define break points that can be acted on in tight places to adjust the length of the conduit. Beneficially, the novel selectable length conduits define multiple break positions that can be selected and readily used to adjust the length of the conduit rather than having to attempt starting a cut with cutting wire at an undefined position.

Selectable Length Conduit Embodiment One

With reference to FIGS. 1-6, a first example of a selectable length conduit, selectable length conduit 100, will now be described. Selectable length conduit 100 includes a tubular body 101, brace members 102, release members 103, and covers 104. The components of selectable length conduit 100 are described further in the sections below.

In some examples, the selectable length conduit does not include one or more features included in selectable length conduit 100, such as not including a release member or a cover. In other examples, the selectable length conduit includes additional or alternative features.

Tubular Body

Tubular body 101 functions to contain fluids or electrical wiring. Tubular body 101 also supports other components of selectable length conduit 100, including brace members 102, release members 103, and covers 104.

FIGS. 1-6 demonstrate that tubular body 101 includes a tube wall 110 surrounding a lumen 111. Wires may be inserted into lumen 111 to isolate them from the space outside tube wall where structures, items, or moisture may exist. The wires disposed in lumen 111 of tubular body 101 are also protected from damage from a nail or saw blade in use near tubular body 101.

As depicted in FIGS. 2-6, tube wall 110 defines a plurality of channels 112, which may also be described as grooves. Channels 112 are formed by circumferentially cutting into an outer surface 113 of tube wall 110. In the example shown in FIGS. 2-6, channels 112 extend around the entire circumference of tube wall 110.

Figure 2:
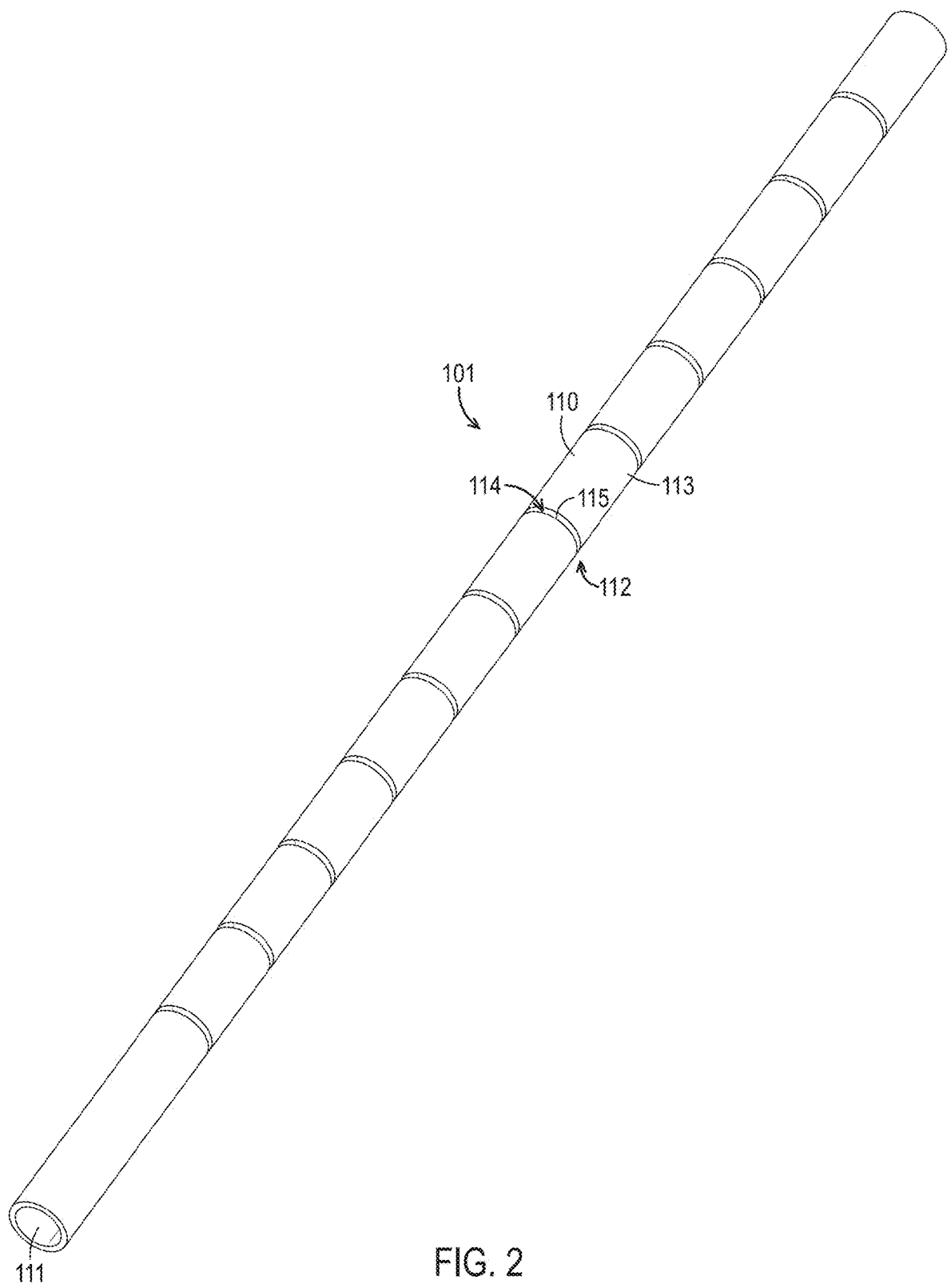
FIG. 2 is a perspective view of a tubular body of the selectable length conduit shown in FIG. 1 without other components to reveal channels defined in the tubular body.
Figure 3:
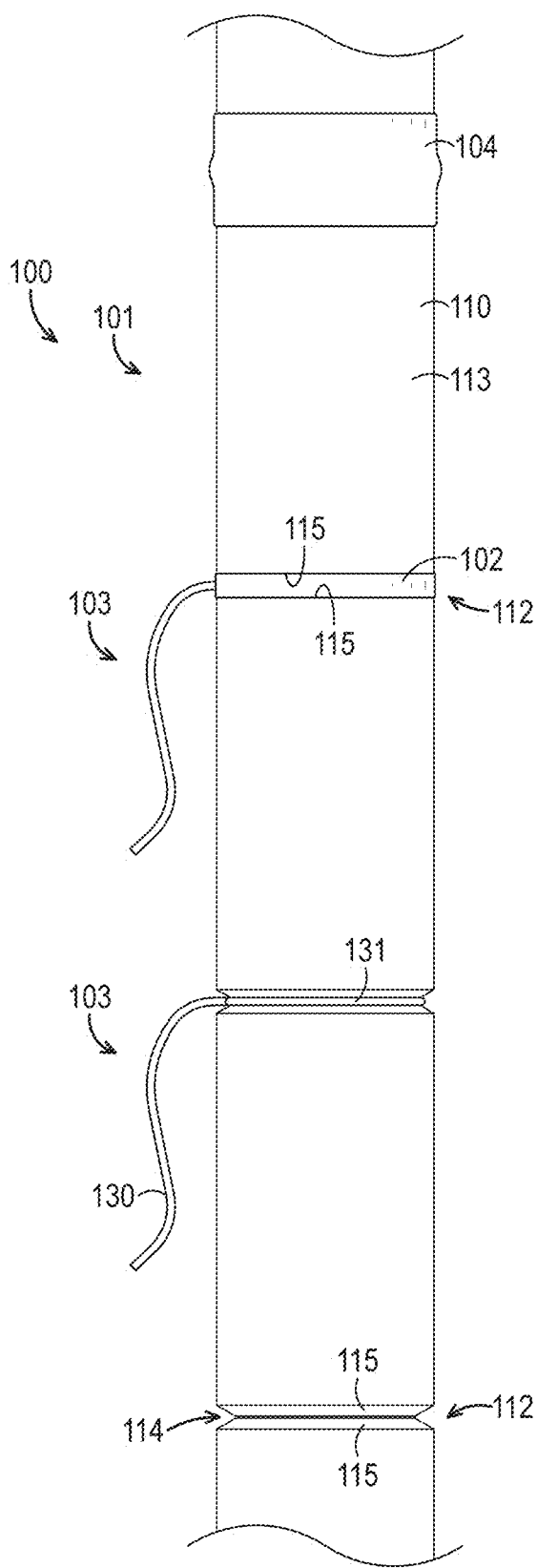
FIG. 3 is a detail, side elevation view of the selectable length conduit shown in FIG. 1 with one channel empty, a release member disposed in a second channel, a release member and a brace member disposed in a third channel, and an adhesive tape covering a release member and a brace member disposed in a fourth channel.

The reader can see in FIGS. 2 and 3 that channels 112 are longitudinally spaced along tube wall 110. As described in more detail below, the longitudinal position of each channel 112 defines selectable length positions for selectable length conduit 100.

Channels 112 extend from outer surface 113 partially though tube wall 110 radially towards a longitudinal axis of tubular body 101. Expressed another way, channels 112 extend from outer surface 113 towards lumen 111, but not entirely through tube wall 110 into lumen 111.

Figure 4:
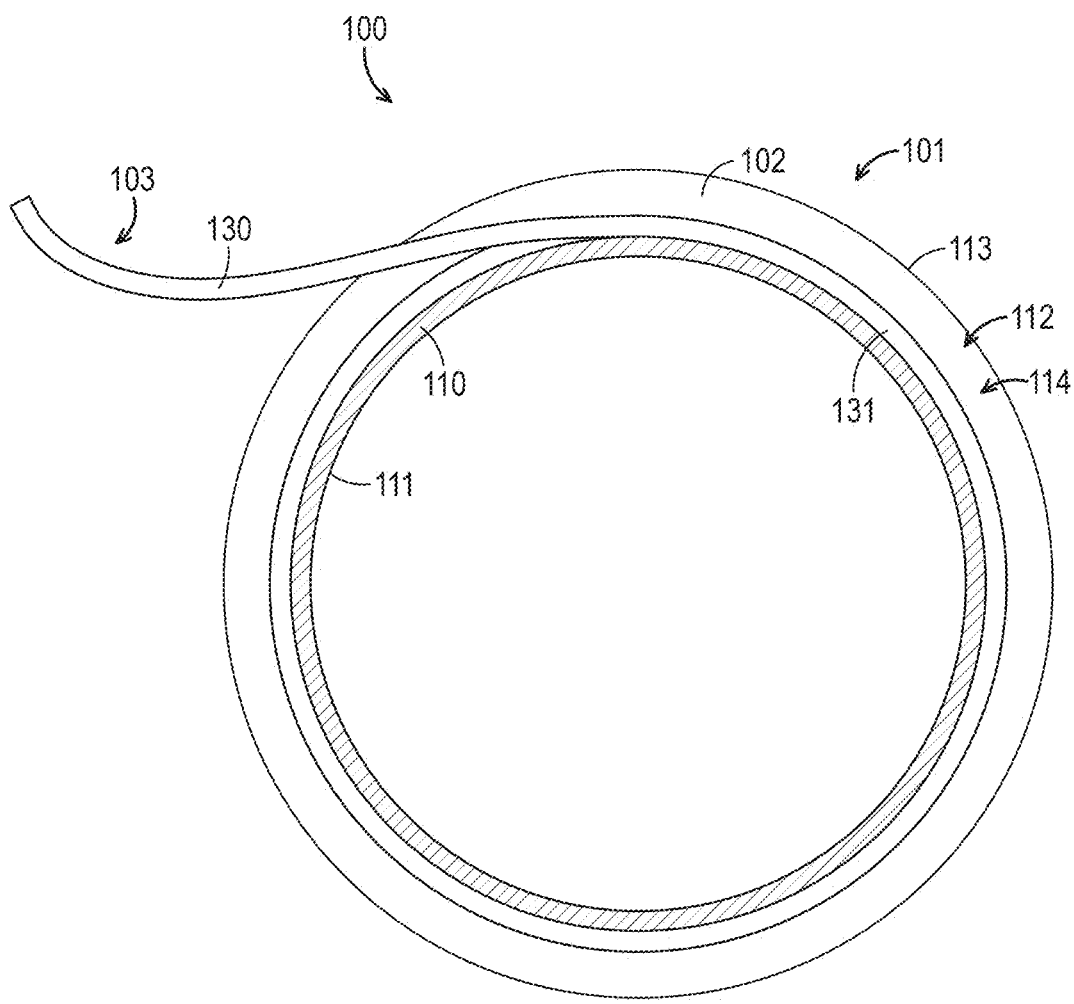
FIG. 4 is a section view across the selectable length conduit at a center of a channel depicting a release member and a brace member disposed in the channel and the release member extending out of the channel beyond the brace member to define a pull portion.

As apparent from FIG. 4, channel 112 extends through at least half the radial thickness of tube wall 110. However, the depth of the channel may vary in different examples. The depth of the channel may be selected to provide sufficient space for a brace member and a release member to be disposed within the channel. Further, the depth of the channel may be selected to weaken the structural integrity of the tube wall to a desired extent based on the material and thickness of the tube wall. The desired extent of structural weakness provided by the channel may be an amount sufficient to enable readily shearing apart the tube wall at the channel by hand.

With reference to FIGS. 2 and 3, the reader can see that each channel 112 defines a channel gap 114. Channel gap 114 is defined between channel sidewalls 115 of tube wall 110. Channel sidewalls 115 are spaced across channel gap 114 of channel 112.

As shown in FIGS. 2 and 3, the channel gap tapers from outer surface 113 towards the longitudinal axis of tubular body 101. FIG. 3 demonstrates that channel 112 has a V-shape when viewed perpendicularly to the longitudinal axis of tubular body 101.

Figure 6:
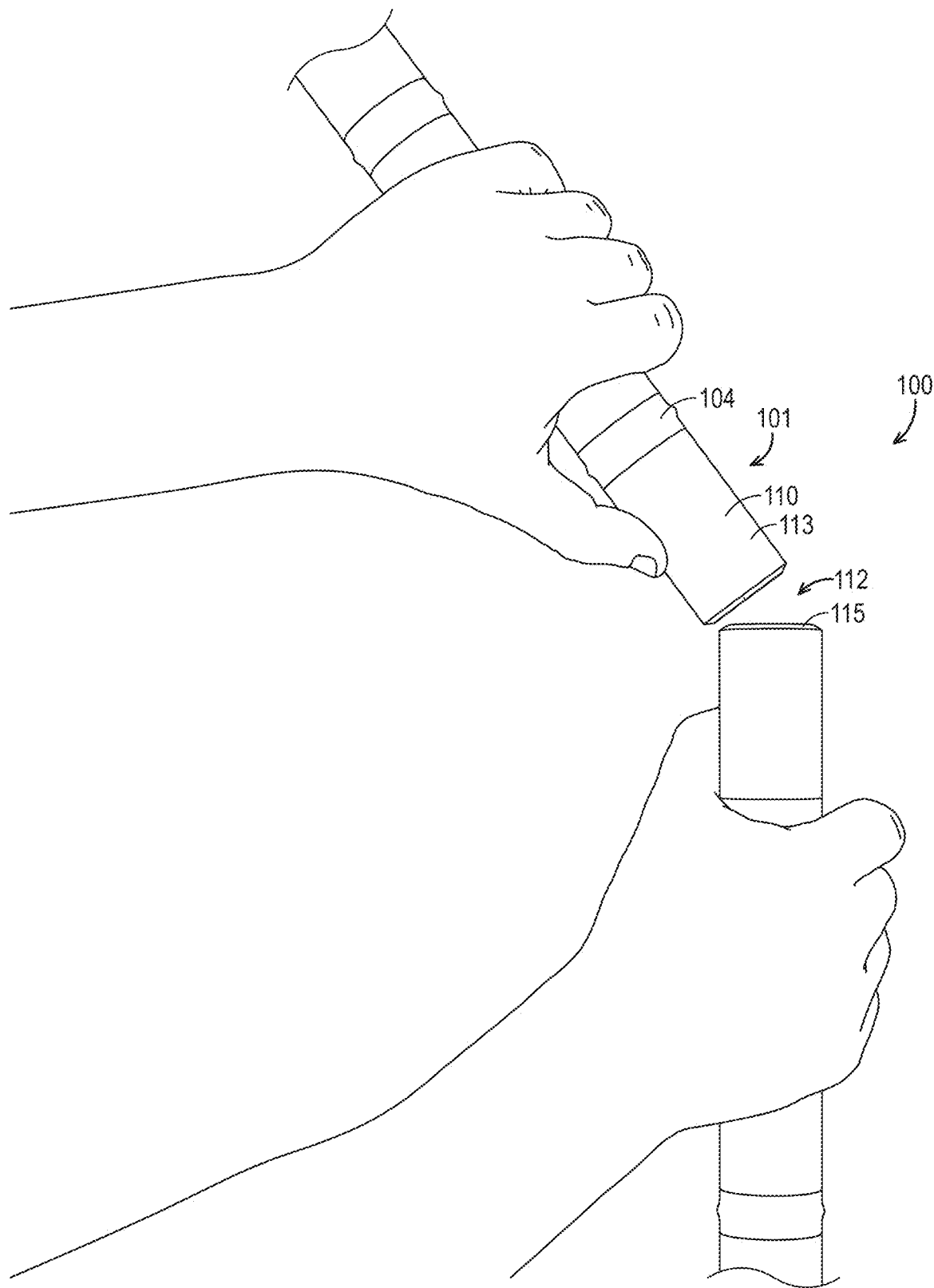
FIG. 6 is a view of a person selectively adjusting the length of the selectable length conduit by breaking the conduit at a channel where the person has removed the brace member.

Channels 112 are configured to weaken the structural integrity of tube wall 110 to facilitate selectively breaking apart tubular body 101 at a selected channel 112 like shown in FIG. 6. Selectively breaking apart tubular body 101 at a selected channel 112 functions to adjust the length of selectable length conduit 100. As shown in FIG. 6, tubular body 101 may be sheared apart at selected channel 112 by applying shear force to tube wall 110 with one's hands.

To facilitate shearing apart tube wall 110 at selected channel 112, brace member 102 is selectively removed from selected channel 112. Removing brace member 102 from selected channel 112 enables tube wall 110 to readily shear at selected channel 112 by allowing the channel sidewalls 115 to move towards each other across channel gap 114 when shear force is applied to tubular body 101.

As shown in FIG. 3, brace member 102 extends across channel gap 114 and abuts sidewalls 115 when brace member 102 is disposed in channel 112. Brace member 102 functions to restrict channel sidewalls 115 from moving towards each other across channel gap 114 when shear force is applied to tubular body 101. Accordingly, the structural weakness of tube wall 110 resulting from channels 112 can be utilized to shear tube wall 110 at a selected channel by selectively removing brace member 102 disposed in selected channel 112. Alternatively, the structural weakness of tube wall 110 resulting from channels 112 can be reinforced to avoid tube wall 110 shearing by keeping or inserting brace members 102 in channels 112.

In the present example, tubular body 101 is formed from poly-vinyl chloride. However, the tubular body may be formed from any material suitable for conduit applications and capable of being selectively sheared at a channel formed in the tubular body. Suitable materials include polymers and metals.

The number of channels defined in the tube wall will vary in different examples. Further, the longitudinal spacing between the channels may be greater or less than the spacing depicted in the figures. Different tubular body examples may include additional or fewer channels than depicted in FIGS. 1-6 and/or with different spacing lengths between the channels. The number of channels defined in the tubular body will determine the number of different length options available for the selectable length conduit.

Brace Members

Brace members 102 function to reinforce tube wall 110 at channels 112 to keep tubular body 101 from shearing at channels 112 until intended to adjust the length of selectable length conduit 100. Brace members 102 restrict channel sidewalls 115 from moving towards each other across channel gap 114 when shear force is applied to tubular body 101. Accordingly, the structural weakness of channels 112 is counteracted by brace members 102 until a brace member 102 is selectively removed from a given channel 112 where a user would like to shear apart tubular body 101 to adjust the length of selectable length conduit 100.

As shown in FIGS. 3 and 4, brace members 102 are disposed in channels 112. In particular, brace members 102 extend across channel gap 114 to abut channel sidewalls 115 on each side of channel 112. Brace members 102 thus brace apart channel sidewalls 115 to counteract the structural weakness of tube wall 110 resulting from channel 112.

Figure 5:
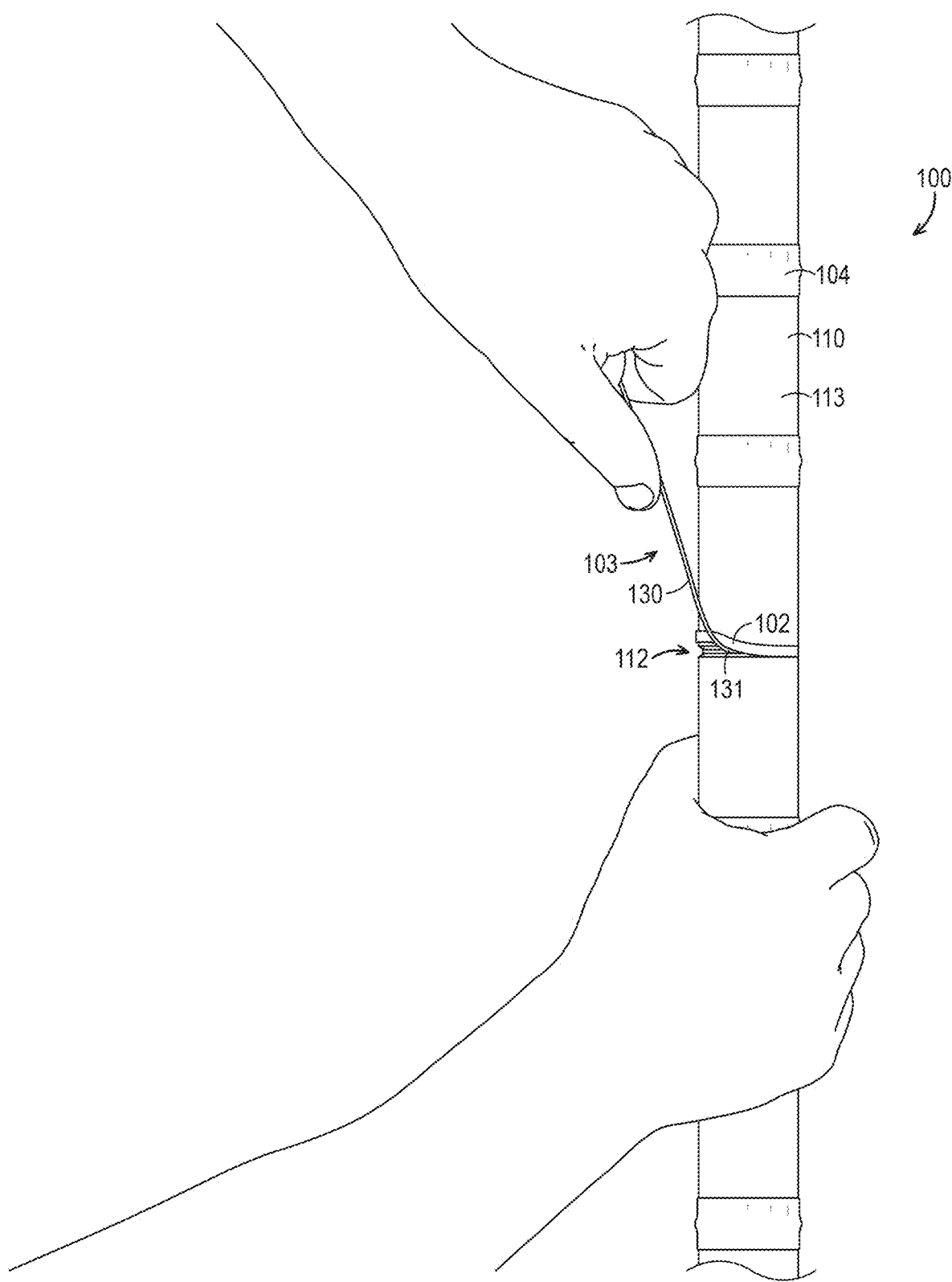
FIG. 5 is a view of the selectable length conduit shown in FIG. 1 with a person pulling a release member at a selected channel to remove a brace member from the selected channel to thereafter enable breaking the conduit at the unsupported channel.

FIG. 5 demonstrates that brace member 102 may be selectively removed from a given channel 112 with release member 103. Release member 103 facilitates removing brace member 102 from channel 112 by dislodging brace member 102, but is not required. In some examples, a release member is not included and the brace member is removed by hand or with a tool, such as a flat screwdriver or knife.

As apparent from FIG. 6, removing brace member 102 from a selected channel 112 enables readily shearing tubular body 101 at the selected channel. With brace member 102 removed from selected channel 112, the structural weakness of tube wall 110 from the selected channel 112 can be utilized to manually shear apart tubular body 101 at selected channel 112. As shown in FIG. 6, tubular body 101 may be sheared apart at selected channel 112 by applying shear force to tubular body 101. Shearing apart tubular body 101 serves to adjust the length of selectable length conduit 100.

The number of brace members included in the selectable length conduit will vary in different examples. The number of brace members will typically correspond to the number of channels formed in the tubular body. Accordingly, different examples of selectable length conduits may include additional or fewer brace members than depicted in the figures.

The size and shape of the brace members is selected to correspond with the size and shape of the channels. Thus, the brace members may be larger or smaller in different examples.

In the present example, brace member 102 is formed from a thermoplastic elastomer. In particular, brace member 102 is formed from a polyvinyl chloride composite material. However, the brace member may be formed from any currently known or later developed material suitable for inserting into and bracing apart the channels. Suitable materials include polymers, metals, woods, cordage, and paper or cloth wadding.

Release Members

Release member 103 facilitates removing brace member 102 from channel 112. In particular, release member 103 dislodges brace member 102 out of channel 112 when release member 103 is pulled.

As shown in FIGS. 3-5, each release member 103 is supported by tubular body 101 partially within channels 112. FIGS. 3-5 demonstrate that release member 103 extends out of channel 112 beyond brace member 102 and beyond outer surface 113 of the tube wall 110. The portion of release member 103 extending out of channel 112 beyond brace member 102 defines a pull portion 130. The portion of release member 103 disposed in channel 112 defines an actuator portion 131.

As depicted in FIG. 5, a user may selectively grasp and pull pull portion 130 of release member 103. FIG. 5 demonstrates that grasping and pulling pull portion 130 causes actuator portion 131 to dislodge brace member 102 within channel 112. Dislodging brace member 102 from within channel 112 facilitates removing brace member 102 from channel 112.

In the example shown in the figures, release member 103 is an elongate tension bearing member, but may have other configurations, such as pull tabs or pivoting levers. Release member 103 is a synthetic fiber, but the release member may be a natural fiber or any other suitable type of member suitable for dislodging the brace member.

Covers

Covers 104 function to selectively cover brace members 102 and release members 103 disposed within channels 112. Covering brace members 102 and release members 103 helps protect and retain those components within channels 112 until a user wishes to remove a brace member 102 from a given channel 112. When a user wishes to remove a brace member 102 from a given channel 112 to adjust the length of selectable length conduit 100, cover 104 can be selectively removed to expose release member 103 and brace member 102 disposed in given channel 112.

In the present example, covers 104 are an adhesive tape adhered to outer surface 113 of tube wall 110 over channels 112. However, the covers may be any suitable material for selectively covering the brace member and the release member within the channel, such as a rubber band or sleeve.

The covers are an optional component not present in all examples of the selectable length conduits.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A selectable length conduit, comprising:
   a tubular body having a tube wall with an outer surface, the tube wall defining a channel extending through the tube wall radially from the outer surface towards a longitudinal axis of the tubular body and circumferentially around the tubular body, the channel defining a channel gap between channel sidewalls of the tube wall spaced across the channel; and
   a brace member disposed in the channel and extending across the channel gap to abut the channel sidewalls, the brace member configured to maintain the structural integrity of the tube wall against shear forces by restricting the channel sidewalls from moving towards each other across the channel gap when shear force is applied to the tubular body;
   wherein:
      the brace member is selectively removable from the channel; and
      the channel is configured to weaken the structural integrity of the tube wall when the brace member is selectively removed from the channel to enable the tube wall to shear at the channel when shear force is selectively applied to the tube wall.

2. The selectable length conduit of claim 1, wherein the tube wall defines a plurality of longitudinally spaced channels.

3. The selectable length conduit of claim 2, further comprising a plurality of brace members disposed in the plurality of longitudinally spaced channels.

4. The selectable length conduit of claim 3, wherein:
   each of the plurality of brace members may be selectively removed from the channel in which it is disposed;
   the brace member selectively removed from the channel in which is it disposed defines a selected brace member; and
   selectively removing the selected brace member and selectively shearing the tube wall where the selected brace member was removed establishes a selected length of the selectable length conduit.

5. The selectable length conduit of claim 1, further comprising a release member operatively supported by the tubular body and configured to selectively dislodge the brace member within the channel when the release member is manipulated to facilitate selectively removing the brace member from the channel.

6. The selectable length conduit of claim 5, wherein the release member is partially disposed in the channel.

7. The selectable length conduit of claim 6, wherein the release member extends out of the channel beyond the outer surface of the tube wall.

8. The selectable length conduit of claim 7, wherein:
   the release member extends out of the channel beyond the brace member;
   the portion of the release member extending out of the channel beyond the brace member defines a pull portion; and
   the portion of the release member disposed in the channel defines an actuator portion.

9. The selectable length conduit of claim 8, wherein selectively grasping and pulling the pull portion causes the actuator portion to dislodge the brace member within the channel.

10. The selectable length conduit of claim 5, further comprising a cover releasably secured to the outer surface of the tube member in a position covering the release member and the brace member.

11. The selectable length conduit of claim 5, wherein the release member is an elongate tension bearing member.

12. The selectable length conduit of claim 11, wherein the release member is a fiber.

13. The selectable length conduit of claim 12, wherein the release member is a synthetic fiber.

14. The selectable length conduit of claim 1, wherein the channel gap tapers from the outer surface towards the longitudinal axis of the tubular body.

15. The selectable length conduit of claim 14, wherein the channel has a V-shape when viewed perpendicularly to the longitudinal axis of the tubular body.

16. The selectable length conduit of claim 1, wherein the channel extends through at least half the radial thickness of the tube wall.

17. The selectable length conduit of claim 1, wherein the tube wall is formed from polyvinyl chloride.

18. The selectable length conduit of claim 1, wherein the brace member is formed from a polymer.

19. The selectable length conduit of claim 18, wherein the brace member is formed from a polyvinyl chloride composite material.

20. The selectable length conduit of claim 18, wherein the brace member is formed from a thermoplastic elastomer.

* * * * *